Jan. 11, 1949.                C. J. ZIRBEL                2,458,671
                              BAIT APPLICATOR
                            Filed Nov. 9, 1946
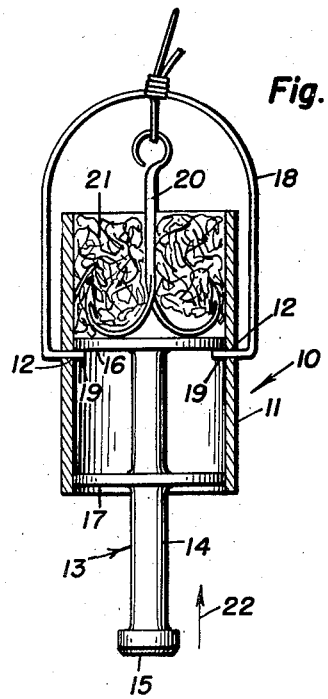
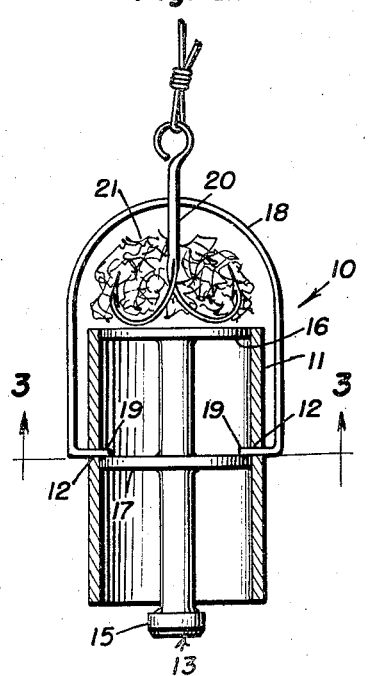
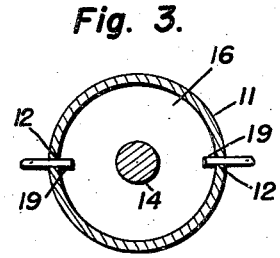
Inventor
Carl J. Zirbel
By
Attorneys Patented Jan. 11, 1949

2,458,671

UNITED STATES PATENT OFFICE 2,458,671

BAIT APPLICATOR

Carl J. Zirbel, Montezuma, Iowa

Application November 9, 1946, Serial No. 709,059

2 Claims. (Cl. 43—4)

This invention relates to new and useful improvements and structural refinements in bait applicators, and the principal object of the invention is to provide a device of the character herein described, such as may be conveniently and effectively employed to facilitate the application of prepared bait on the fish hook.

A further object of the invention is to provide a bait applicator which is simple in construction and which may be easily manipulated.

Another object of the invention is to provide a bait applicator which, when not required, may be conveniently carried upon the person of the user.

An additional object of the invention is to provide a bait applicator which will not easily become damaged and which will readily lend itself to economical manufacture.

With the above more important objects in view and such other objects as may become apparent as this specification proceeds, the invention consists essentially of the construction and arrangement of parts as shown in the accompanying drawings in which:

Figure 1 is a cross sectional view of the invention at the commencement of the bait applying step;

Figure 2 is a cross sectional view similar to that shown in Figure 1, but illustrating the invention at the conclusion of the bait applying step, and Figure 3 is a cross sectional view, taken substantially in the plane of the line 3—3 in Figure 2.

Like characters of reference are used to designate like parts in the specification and throughout the several views.

Referring now to the accompanying drawings in detail, the invention consists of a bait applicator designated generally by the reference character 10, the same embodying in its construction an open ended, tubular sleeve 11 provided intermediately of its length with a pair of diametrically opposed apertures 12.

A plunger 13 consists of a stem 14 provided at one end thereof with an enlarged head 15, the remaining end of the stem 14 being equipped with a disc 16. A further disc 17 is provided intermediately the length of the stem 14 and it should, of course, be understood that if desired, the plunger 13, as a whole, may be formed integrally from one piece of material.

An arcuate handle 18 formed from a wire-like rod, straddles the sleeve 11 and the end portions 19 of the handle are inturned and axially aligned, as will be clearly apparent. The end portions 19 extend rotatably through the aforementioned apertures 12 and are disposed intermediately of the discs 16, 17 which are slidably receivable in the sleeve 11.

When the invention is placed in use, the plunger 13 is disposed in the lower end portion of the sleeve 11, as indicated in Figure 1. The plunger is supported in this position by the engagement of the disc 16 with the end portions 19 of the handle 18, said end portions, in effect, functioning as stops.

The fishing hook 20 may then be inserted in the sleeve 11 above the disc 16 and prepared bait 21 may be packed in the sleeve around the hook, as will be clearly understood.

Thereupon, by forcing the head 15 of the plunger 13 in the direction of the arrow 22, the disc 16 will push the hook and the bait upwardly, as indicated in Figure 2. At the commencement of this action, the bait will be compressed, as it were, and will adhere to the hook so that when the applying step is completed, the hook and the applied bait may be integrally removed from the device.

It will be seen from the foregoing that the plunger 13 functions both as a compressor and as an ejector in applying the bait, and if it is found necessary, finger pressure may, of course, be applied for obvious reasons to the upper surface of the bait during the applying step.

It should be added that during the ejection of the applied bait, the disc 17 will engage the end portions or stops 19 as shown in Figure 2, and will thereby prevent the plunger from traveling excessively in the upward direction.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A bait applicator comprising in combination, a sleeve, a plunger and a pair of spaced discs provided thereon, said plunger being slidable in said sleeve, and means in said sleeve engageable selectively with said discs for restricting the extent of movement of said plunger.

2. A bait applicator comprising in combination, an open ended sleeve provided intermediately of its length with a pair of diametrically opposed apertures, a plunger comprising a stem and an enlarged head at one end thereof, a disc at the remaining end and a further disc intermediately the length of said stem, said plunger being slidable in said sleeve, and an arcuate handle formed from wire-like material, the end portions of said handle being inturned and extending rotatably through said apertures, said end portions being disposed intermediately of said discs and constituting stops for said plunger.

CARL J. ZIRBEL.

REFERENCES CITED

The following references are of record in the file of this patent:

UNITED STATES PATENTS

| Number | Name | Date |
| --- | --- | --- |
| 2,367,242 | Stacy | Jan. 16, 1945 |

FOREIGN PATENTS

| Number | Country | Date |
| --- | --- | --- |
| 15,557 | Great Britain | 1909 |
| 215,945 | Germany | Nov. 5, 1909 |